United States Patent [19]

Rosa

[11] 4,220,911
[45] Sep. 2, 1980

[54] THYRISTOR TAP CHANGER FOR ELECTRICAL INDUCTIVE APPARATUS

[75] Inventor: John Rosa, Penn Hills, Pa.

[73] Assignee: Westinghouse Electric Corp., Pittsburgh, Pa.

[21] Appl. No.: 940,809

[22] Filed: Sep. 8, 1978

[51] Int. Cl.² .............................................. G05F 5/00
[52] U.S. Cl. .............................................. 323/43.5 S
[58] Field of Search ....................... 323/43.5 R, 43.5 S

[56] References Cited

U.S. PATENT DOCUMENTS

| | | | |
|---|---|---|---|
| 3,195,038 | 7/1965 | Fry | 323/43.5 S X |
| 3,619,765 | 11/1971 | Wood | 323/43.5 S |
| 3,700,925 | 10/1972 | Wood | 323/43.5 S X |
| 3,909,697 | 9/1975 | Depenbrock | 323/43.5 S X |

Primary Examiner—William M. Shoop
Attorney, Agent, or Firm—D. R. Lackey

[57] ABSTRACT

Tap changing apparatus including a plurality of electrical inductive windings, each having an intermediate tap which divides each winding into two sections with the voltage of one section being twice that of the other section. Gate-controlled electronic switches, disposed between the ends and the intermediate tap of each winding and each of two output terminals, are selectively triggered to form a conductive path which will cause either or both sectons of each tapped winding to be connected into a circuit so that it will aid, oppose or bypass the circuit. The switching sequences provide a full range of positive to negative output voltage magnitudes for each winding in incremental unit steps.

4 Claims, 3 Drawing Figures

THYRISTOR TAP CHANGER FOR ELECTRICAL INDUCTIVE APPARATUS

BACKGROUND OF THE INVENTION

1. Field of the Invention

This invention relates, in general, to electrical control apparatus and, more specifically, to tap changers for electrical inductive apparatus.

2. Description of the Prior Art

Tap changing is used extensively in a wide variety of electrical inductive apparatus, such as AC voltage regulating transformers, HVDC rectifiers and phase angle regulators. Most of the tap changing methods utilize a switching means to alternately connect various sections of one winding of the electrical inductive apparatus into a circuit. One extensively used switching means is a mechanical contact switch in which a movable contact selectively engages stationary contacts connected to various tap sections of the winding so as to connect varying numbers of turns of the winding into the circuit.

Another type of switching means used with increasing frequency due to its fast response time and lack of mechanical wear is the electronic switch. The electronic switches are typically electrically controlled gate devices, such as thyristors, which are connected as an inverse parallel-connected pair to each tap of a winding, as shown in U.S. Pat. No. 3,195,038. A control device triggers predetermined ones of the thyristor pairs to connect or bypass certain ones of the tap winding sections into the circuit and thereby provide a wide range of individual output voltage increments for an electrical inductive apparatus. The total number of discrete voltage increments may be extended, as shown in the above-referenced patent, by utilizing additional thyristor pairs with each winding section to reconfigure the relative polarity of the winding sections and thereby dispose each winding section in additive or opposing relation with the remainder of the winding sections. Further, tapped secondary windings may be utilized with appropriate switch devices to increase the tap range of the electrical inductive apparatus, as shown in U.S. Pat. No. 3,195,038, 3,909,697 and, also, in U.S. Pat. No. 3,700,925, which is assigned to the assignee of the present invention.

Several of the prime considerations affecting economical usage of solid-state tap changers in electrical inductive apparatus are the total number of electrical switches and individual winding sections required to provide a predetermined number of discrete output voltage increments within the total output voltage range of the electrical inductive apparatus. Obviously, the cost of the tap changer may be reduced if fewer switches are needed to provide a predetermined number of discrete output voltage increments and, further, the electrical inductive apparatus itself may be less costly and more easily constructed if fewer individual winding sections are utilized.

Prior art electronic tap changing arrangements have certain drawbacks regarding these considerations since they require an excessive number of switches or individual winding sections to provide the large number of discrete output voltage increments desirable in present applications of such electrical inductive apparatus.

Thus, it is desirable to provide an electrical inductive apparatus having an improved tap changer means which provides a maximum number of discrete output voltage increments through the use of a minimum number of individual switch devices or winding sections.

SUMMARY OF THE INVENTION

There is disclosed herein a new and improved switch arrangement suitable for use in a tap changer for an electrical inductive apparatus. The electrical inductive apparatus includes a plurality of secondary windings, each having an intermediate tap which divides the windings into two sections, with the output voltage of one section being twice that of the other section of each secondary winding. Triggerable switching means, each comprised of a pair of gate-controlled electronic switches connected in an inverse parallel configuration, connect the ends and the intermediate tap of each section of the secondary winding to output terminals associated with each winding; with one of the switch means being disposed between each end or intermediate tap of the winding and each output terminal. A gate control device provides signals to selectively trigger predetermined ones of the switch means to form a conductive path which will cause each or both sections of each secondary winding to be connected into a circuit so that it will aid, oppose or bypass the circuit. In this manner, the output voltage of each secondary winding may be varied between the maximum positive and negative magnitudes of the combined output voltages of the first and second tapped winding sections in unit increments.

In multiple tapped secondary winding arrangements, the voltage of the first section of each secondary winding varies geometrical progression of seven, with the voltage of the other section of each secondary winding being twice that of the respective first section in order to provide all of the incremental voltage steps between the maximum positive and negative output voltage magnitudes across both sections of each secondary winding.

A tap changer switch arrangement constructed according to the teachings of this invention provides a maximum number of incremental voltage steps on each secondary winding with fewer electronic switches or individual secondary windings than similar prior art tap changing arrangements. In comparison with prior art switch arrangements utilizing untapped secondary windings, the switch arrangement of this invention provides more discrete output voltage steps for the same number of switch elements utilized or, conversely, requires fewer switch elements to provide an equal number of discrete output voltage increments. Further, the switch arrangement of this invention uses less individual secondary windings than the prior art configuration described above which reduces the cost and complexity of the electrical inductive apparatus.

The switch arrangement of this invention is also superior to prior art switch circuits utilizing tapped secondary windings. These types of prior art switch circuits either do not provide the full range of incremental voltage steps or utilize a centertapped secondary winding to provide both positive and negative magnitudes of the output voltage, which accordingly requires the use of only one-half of each secondary winding at any one instant. The switch arrangement of this invention, on the other hand, makes more effective use of each secondary winding since both tapped winding sections may be connected into the circuit at the same time thereby reducing the number of secondary windings required to provide the full output voltage range in incremental unit steps. The switch arrangement disclosed herein provides these advantages by utilizing a tapped secondary winding in which the voltage of one section of the winding is twice that of the other section. This differs from those prior art arrangements using center-tapped secondary windings which, obviously, provide equal voltages on each section of the tapped winding. Furthermore, in one embodiment of this invention, the output voltage of the first section of each tapped secondary winding varies in a geometrical progression of seven, with the second section of each secondary winding having an output voltage twice that of the corresponding first section, in order to provide the full range of output voltage in incremental unit steps. However, this type of secondary winding configuration is unworkable with certain secondary winding voltage progressions suggested in the prior art, such as 1, 3, 9, 27, etc., since such configurations do not provide all of the incremental steps within the entire output voltage range of the switch circuit when utilized in the switch arrangement disclosed herein.

BRIEF DESCRIPTION OF THE DRAWING

The various features, advantages and other uses of this invention will become more apparent by referring to the following detailed description and drawing, in which.

DESCRIPTION OF THE PREFERRED EMBODIMENT

Figure 1:
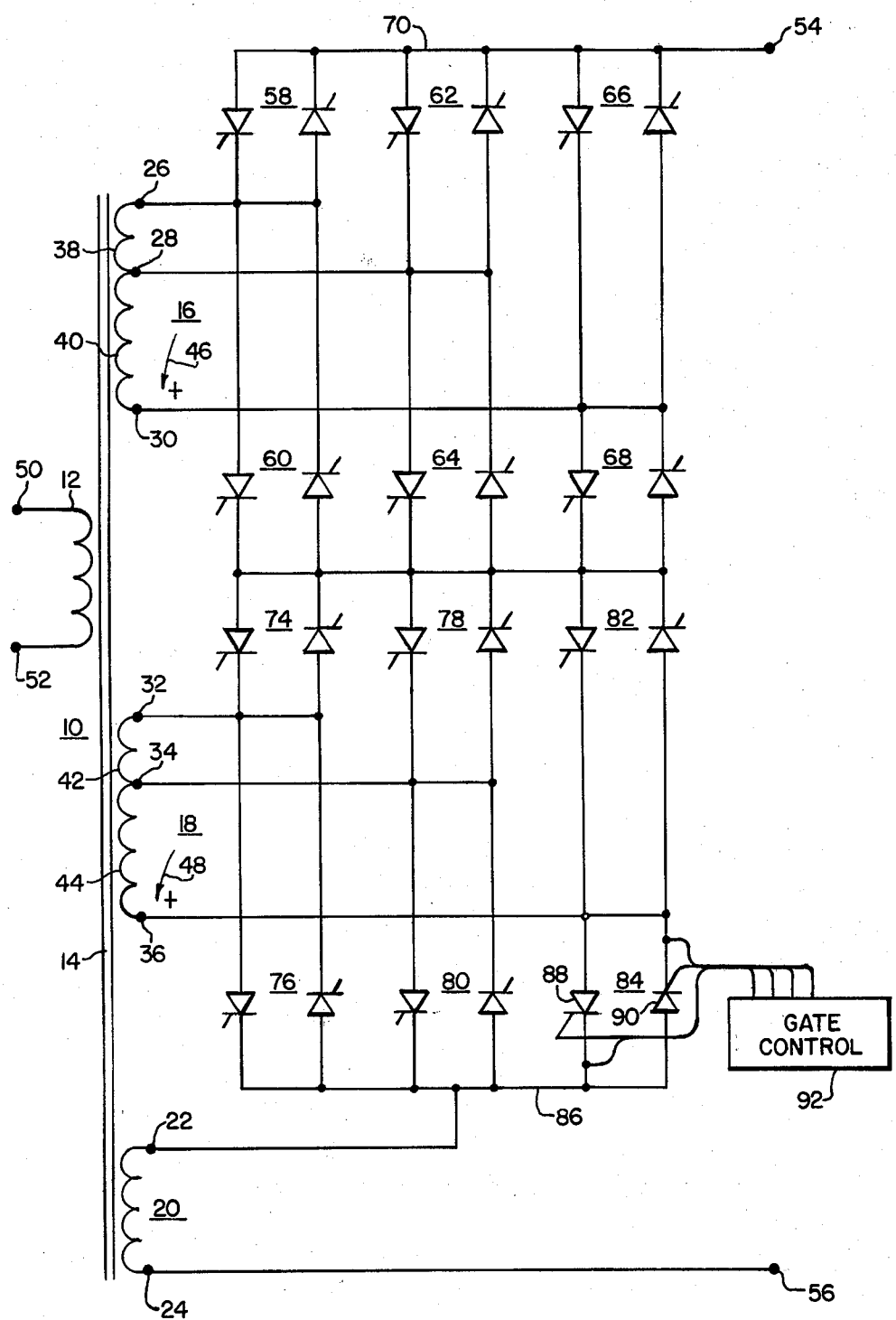
FIG. 1 is a schematic diagram illustrating a tap changing switch arrangement constructed according to the teachings of this invention.

Referring now to the drawing, and to FIG. 1 in particular, there is shown a schematic diagram of a tap changer switch arrangement constructed according to the teachings of this invention which is suitable for use with an electrical inductive apparatus, such as a transformer 10. The transformer 10 includes a primary winding 12, a magnetic core symbolically indicated by reference number 14 and a plurality of secondary windings 16, 18 and 20. Although three secondary windings are illustrated, it is to be understood that more or less secondary windings may be utilized as application requirements dictate.

Secondary winding 20 provides a fixed voltage across its terminals 22 and 24. Two tapped secondary windings 16 and 18 are also provided, each having first and second ends respectively connected to first and second terminals, such as terminals 26 and 30 for secondary winding 16 and terminals 32 and 36 for secondary winding 18. Each of the secondary windings 16 and 18 further includes an intermediate tap brought out to a terminal, such as terminal 28 in secondary winding 16 and terminal 34 in secondary winding 18. The intermediate tap divides each of the secondary windings 16 and 18 into first and second sections, such as sections 38 and 40 in secondary winding 16 and first and second sections 42 and 44 in secondary winding 18. Further, the intermediate tap in the secondary windings 16 and 18 divides each secondary winding into two sections of unequal number of turns, with the second section of each secondary winding having twice the number of turns of the corresponding first section such that the voltage induced in the second section of each secondary winding 16 and 18 will be twice the magnitude of the voltage induced in the corresponding first section of secondary windings 16 and 18. Thus, if the first section 38 of the secondary winding 16 produces an output voltage of magnitude V, the second portion 40 of secondary winding 16 will produce an output voltage of magnitude 2 V. Throughout the following discussion, the use of numbers 1, 2, 7, 14, etc. with respect to the output voltage of the various secondary winding sections is intended to indicate relative magnitudes only and not the actual voltage produced by each winding section.

For reasons that will become apparent hereafter, the first section of each of the secondary windings 16 and 18 is formed of a predetermined number of turns such that the output voltage produced by each first section, such as section 38 in secondary winding 16 and section 42 in secondary winding 18 varies in a geometric progression of seven. Thus, in the above example, the first section 38 of the secondary winding 16 is formed of a predetermined number of turns so as to produce an output voltage of magnitude V. The first section 42 of secondary winding 18 will accordingly have a predetermined number of turns so as to produce an output voltage equal to 7 V. Since the second sections 40 and 44 of the respective secondary windings 16 and 18 are formed of a predetermined number of turns so as to produce an output voltage of twice the magnitude of the corresponding first section, the second section 40 of secondary winding 16 will produce an output voltage equal in magnitude to 2 V; while the second section 44 of the secondary winding 18 will produce an output voltage equal to 14 V. Additional secondary windings may also be utilized to increase the number of tapped increments and, according to the above geometric progression, another secondary winding would have a first section producing an output voltage equal to 49 V and a second section producing an output voltage of magnitude 98 V. Although secondary windings having the number of turns of the first winding sections varying in a geometric progression of seven are illustrated and provide a maximum number of discrete output voltage increments per secondary winding; certain other progressions, such as 1, 2, 4, 8, etc., are also within the teachings of this invention.

Each of the secondary windings 16 and 18 are wound in a predetermined direction around the magnetic core 14. Current flow through the secondary windings 16 and 18 in a first or positive polarity direction will result in the number of turns of the respective secondary winding being added to the number of turns of the other secondary windings connected in the circuit. Current flow through the secondary windings in the opposite or negative direction will correspondingly result in the number of turns of the respective secondary winding being in opposing relationship thereby subtracting the number of turns of that particular secondary winding from the number of turns of the other secondary windings connected to the circuit. For convenience, current flow through each of the secondary windings 16 and 18 in the direction of arrows 46 and 48, respectively, will dispose each of the respective secondary windings in aiding or additive relationship with the other secondary windings connected in the circuit.

In operation, the primary winding 12 has terminals 50 and 52 which are connected to a suitable source of AC voltage. A current flowing in the primary winding 12 induces a voltage in the secondary windings 16, 18 and 20 which appears between the first and second secondary output terminals 54 and 56, respectively. The magnitude of the voltage appearing across secondary output terminals 54 and 56 is dependent upon which portion of the secondary windings 16 and 18 are connected along with secondary winding 20 between the secondary output terminals 54 and 56; as well as the relative polarities of the interconnected secondary windings 16, 18 and 20. The means for interconnecting portions of the secondary windings 16 and 18 to the secondary output terminals 54 and 56 and, thence, into the circuit, includes triggerable switch means which are connected between the terminals of the respective secondary windings 16 and 18.

As shown in FIG. 1, first, second, third, fourth, fifth and sixth switch means 58, 60, 62, 64, 66 and 68, respectively, are associated with secondary winding 16. The first and second switch means 58 and 60 are respectively connected between the first terminal 26 of the secondary winding 16 and first and second output terminals, generally indicated by reference numbers 70 and 72, respectively. Similarly, third and fourth switch means 62 and 64, respectively, are connected between the intermediate tap terminal 28 of the secondary winding 16 and the first and second terminals 70 and 72; while the fifth and sixth switch means 66 and 68 are respectively connected between the second terminal 30 of the secondary winding 16 and first and second terminals 70 and 72 associated with the secondary winding 16. Since secondary winding 16 is the first secondary winding of the transformer 10, the associated first terminal 70 is connected to the first secondary circuit terminal 54. The second terminal 72 of the secondary winding 16 is connected to the first terminal of the next secondary winding switching circuit in a multiple winding configuration, both of which are generally indicated by reference number 72 in FIG. 1. First, second, third, fourth, fifth and sixth switch means 74, 76, 78, 80, 82 and 84, respectively, are associated with secondary winding 18 and are connected between the output terminals 32, 34 and 36 of the secondary winding 16 and terminals 72 and 86 associated with secondary winding 18 in an identical manner as the switch means associated with secondary winding 16.

The switch means, such as switch means 84, comprises triggerable semiconductive devices which are capable of being switched in a relatively short period of time, such as 1.0 to 2 microseconds. Solid-state, semiconductor, four-layer devices, such as thyristors, and more particularly silicon-controlled rectifiers or gate-controlled switches, are particularly suitable for use in the switching means. Each switching means, such as switching means 84, includes a pair of thyristors, such as thyristors 88 and 90, which are connected in an inverse parallel configuration so as to provide two opposing unidirectional conductive paths respectively therethrough during each half cycle of the AC current flow.

Each thyristor forming the switch means of this invention is triggered to a conductive state by means of a suitable control signal applied to its gate electrode. According to the teachings of this invention, a suitable gate control means 92 is provided to trigger selected ones of the thyristors forming the switch means of this invention. Although the gate control means is illustrated as being connected only to the gates of thyristors 88 and 90 which form switch means 84, it will be understood that similar control lines extend from the gate control means 92 to the thyristors of the other switch means utilized in the switching circuit of this invention to enable the gate control means 92 to selectively trigger predetermined ones of the switch means and thereby provide a conductive path between the circuit terminals 54 and 56. The gate control means 92 includes suitable circuitry which selects which ones of the switch means are to be triggered as well as determining at which point in time the selected switch means are to be biased to a conducting state to allow current flow therethrough. Since the gate control means does not form a part of this invention and, further, since any suitable means, such as a solid-state logic circuit, well known in the art is capable of providing the proper sequence of control signals to the thyristors forming each of the switch means, further details relating to the construction of the gate control means 92 will not be described herein.

For a better understanding of this invention, the operation of the above-described tap changer switch arrangement will now be described in detail. For clarity, the following description relates only to the operation of the switch means associated with secondary winding 16 of the transformer 10; it being understood that the switch arrangement associated with secondary winding 18 functions in an identical manner. In general, the control means 92 selectively triggers certain of the switch means to provide a plurality of different conductive paths between the circuit terminals 54 and 56, each of which has a distinct output voltage magnitude. Since each section of the secondary winding 16 is bridged by a pair of switching means, each section of the secondary winding 16 may be connected into the circuit in either polariity direction such that the voltage induced in a particular section may be added to the voltages induced in other windings or it may be disposed in opposing relationship so as to subtract from the voltages provided by the other windings in the circuit. In the additive relationship, each of the sections 38 and 40 forming the secondary winding 16 are connected into the circuit such that current flows therethrough in a first or positive polarity direction, as indicated by arrow 46. When either section 38 or 40 of the secondary winding 16 is connected into the circuit such that current flows therethrough in the direction opposite to that indicated by arrow 46, the winding section is connected in opposing relationship with the other winding sections in the circuit. In addition, each winding section 38 and 40 forming secondary winding 16 may be individually bypassed thereby providing only the voltage induced in the other of the winding sections 38 and 40 between the output terminals of the secondary winding 16.

The six switch means 58, 60, 62, 64, 66 and 68 associated with the tapped secondary winding 16 enable the winding sections 38 and 40 to be interconnected in seven different combinations, each providing a discrete voltage level. When switch means 58 and 68 are triggered to a conductive state by control means 92, current flows through the first and second sections 38 and 40 of the secondary winding 16 in the first or positive polarity direction, such that winding sections 38 and 40 are disposed in additive relation to produce an output voltage between terminals 70 and 72 of the secondary winding 16 equal to the sum of the individual voltages induced in each winding section 38 and 40. According to the earlier example, this total voltage equals +3 V which is the sum of the individual voltages +V and +2 V induced in the first and second winding sections 38 and 40, respectively, of the secondary winding 16. Similarly, when switch means 62 and 68 are gated to a conductive state, current flows through second winding section 40 of the secondary winding 16 in a positive polarity direction thereby providing an output voltage between terminals 70 and 72 equal to a magnitude of +2 V. When switch means 58 and 64 are triggered, the first winding section 38 produces an output voltage between the terminals 70 and 72 of the secondary winding 16 equal to a +V magnitude. When any of the switch pairs 58 and 60, 62 and 64 or 66 and 68 are both triggered to a conductive state by the gate control means 92, both of the first and second winding sections 38 and 40 forming the secondary winding 16 are bypassed, such that no voltage appears between the terminals 70 and 72.

Another conductive path is formed when switch means 60 and 62 are triggered to a conductive state. In this configuration, current flows through the first winding section 38 of the secondary winding section 16 in the second or negative polarity direction, or in an opposite direction to that indicated by arrow 46, thereby producing a voltage between terminals 70 and 72 having a −V magnitude. Similarly, when switch means 64 and 66 are triggered, current flows through the second winding section 40 of the secondary winding 16 in the second polarity or negative direction so as to produce an output voltage between terminals 70 and 72 having a −2 V magnitude. Finally, when switch means 60 and 66 are triggered to a conductive state, current flows through both of the first and second winding sections 38 and 40 in the second polarity direction so as to produce an output voltage between terminals 70 and 72 equal to the sum of the individual voltages induced in the first and second winding sections 38 and 40, which is equal to a −3 V magnitude. Thus, it is apparent that the use of six switching means and two winding sections of a tapped secondary winding, one of which produces an output voltage equal to twice that of the other winding section, provides a total output voltage range of 6 V in seven incremental unit steps from −3 V to +3 V.

Similarly, secondary winding 18, having first and second sections 42 and 44 respectively producing output voltages of relative magnitude 7 V and 14 V, may be interconnected by switch means 74, 76, 78, 80, 82 and 84 to provide a range of output voltage magnitudes of −21 V, −14 V, −7 V 0, +7 V, +14 V, and +21 V. Since the second output terminal 72 associated with the first secondary winding 16 forms or is connected to the first terminal associated with secondary winding 18, triggering selected ones of the switch means associated with both secondary windings 16 and 18 provides a total voltage range between terminals 70 and 86 of from −24 V to +24 V in forty-nine incremental unit steps.

The large number of incremental voltage steps provided by the above-described switching arrangement is especially advantageous when the switching arrangement and associated tapped secondary windings are connected to a third secondary winding having a fixed or permanent output voltage which is equal to the highest voltage magnitude produced by the switching arrangement, such as +24 V in the above example. Thus, if secondary winding 20, shown in FIG. 1, produces an output voltage equal to +24 V, the voltage produced between the circuit terminals 54 and 56 may be varied between 0 and +48 V in incremental unit steps.

Figure 2:
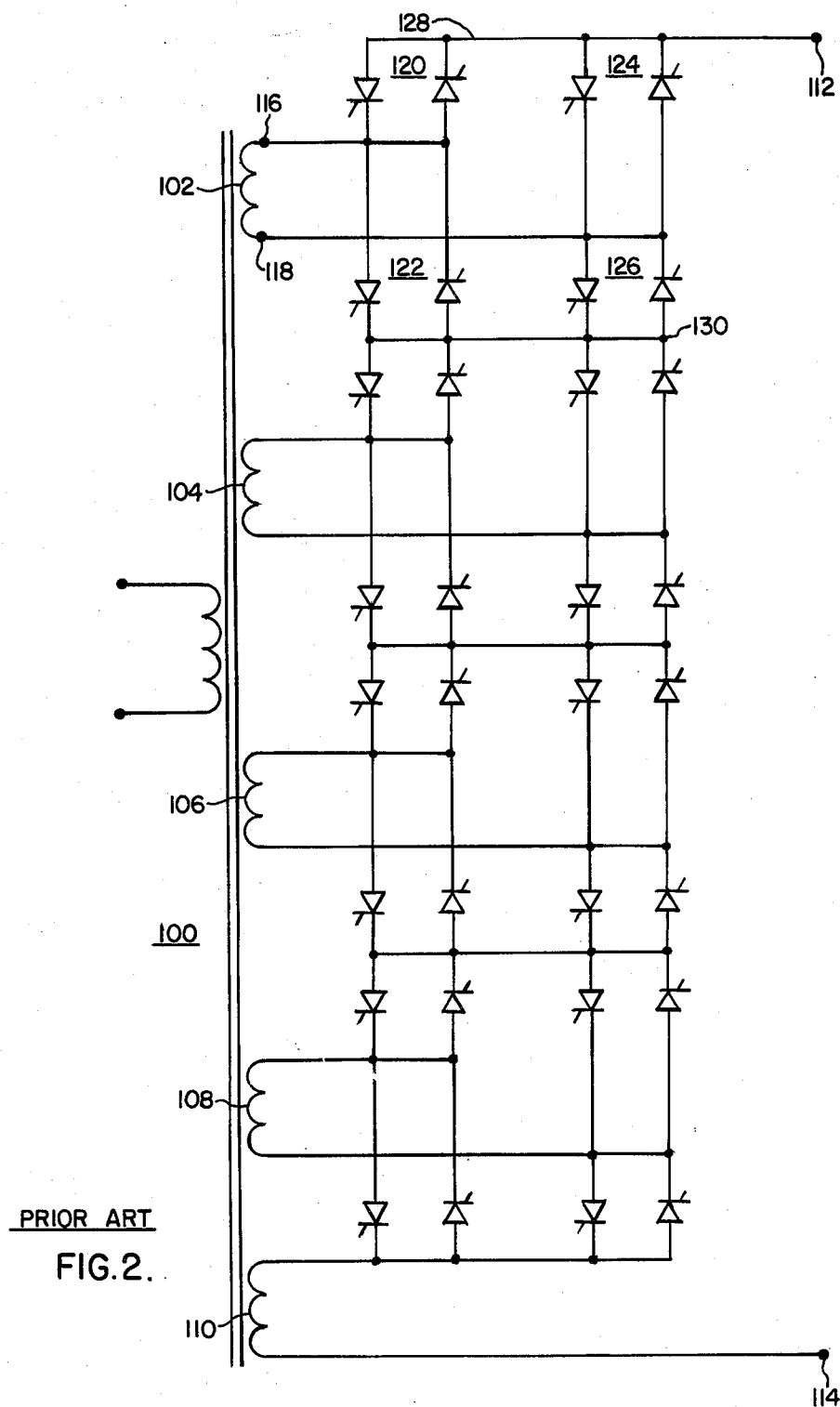
FIG. 2 is a schematic diagram illustrating a tap changing switch arrangement constructed according to the prior art.
Figure 3:
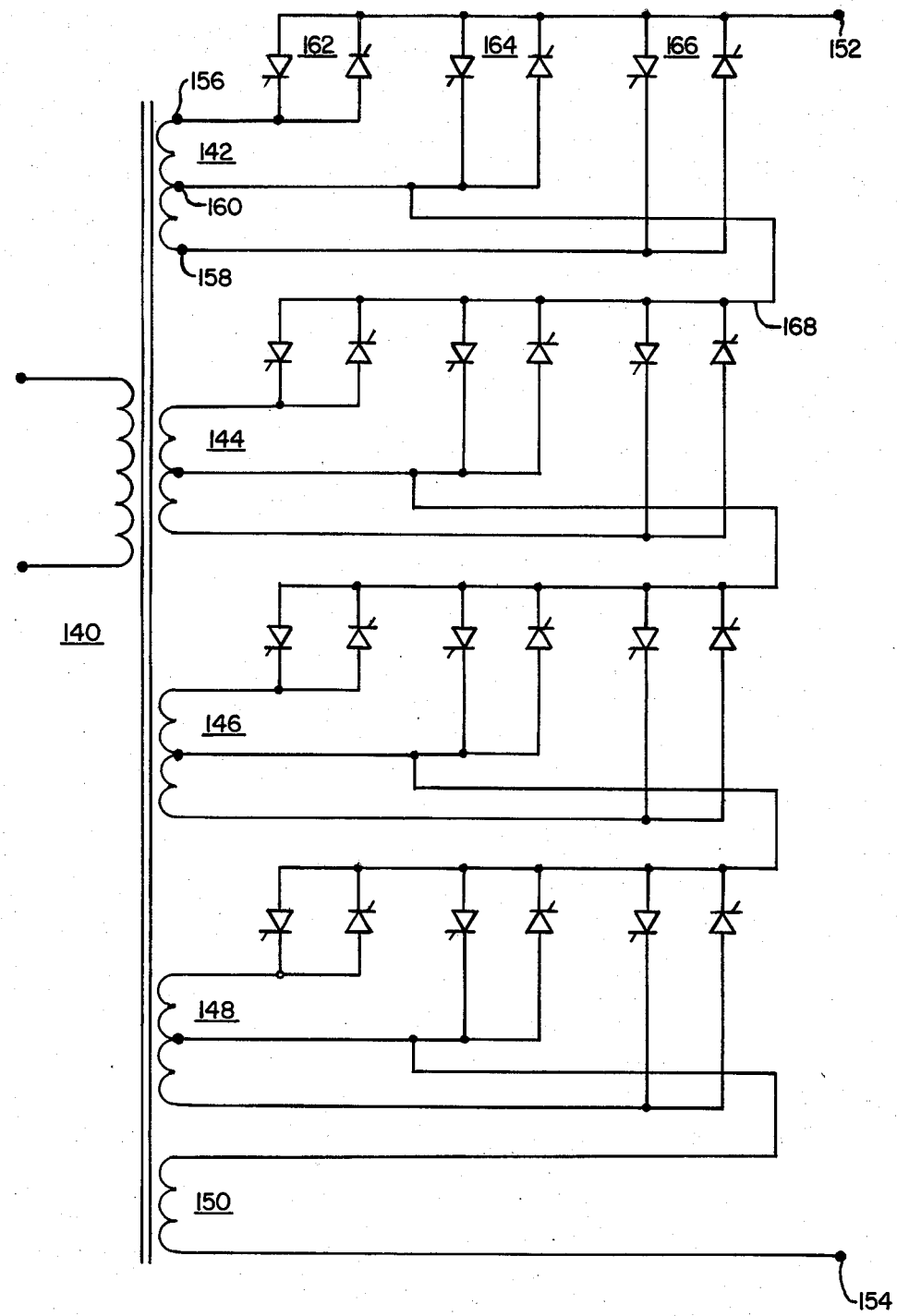
FIG. 3 is a schematic diagram of another tap changing switch arrangement constructed according to the prior art.

The advantages of the switch arrangement described above over prior art tap changer switch arrangements utilizing gate-controlled switches will be more clearly understood by referring to FIGS. 2 and 3 which illustrate typical prior art tap changing switch arrangements. There is shown in FIG. 2, a transformer 100 having four secondary windings 102, 104, 106 and 108 associated with a switching arrangement to be described hereafter and a fifth secondary winding 110 which are interconnected to provide a variable output voltage between terminals 112 and 114. For consistency with the switch arrangement illustrated in FIG. 1, the secondary windings 102, 104, 106 and 108 respectively produce output voltages of relative magnitude V, 2 V, 7 V and 14 V. The first and second ends of each secondary winding are connected by first and second switch elements, each consisting of a pair of inversed, parallel-connected thyristors, to the first and second output terminals associated with each secondary winding. Thus, the first end 116 of secondary winding 102 is connected by a switch means 120 to a first terminal 128 and by switch means 122 to a second terminal 130. Similarly, the second end 118 of secondary winding 102 is connected by switch means 124 to the first terminal 128 and by switch means 126 to the second terminal 130. Since the switch arrangements associated with secondary windings 104, 106 and 108 are identical to that described above for secondary winding 102, they will not be described in detail below. Appropriate gating signals from a control means, not shown, cause the secondary windings 102, 104, 106 and 108 to be interconnected in additive, opposing or bypassed configuration in order to provide an output voltage between secondary terminals 112 and 114 ranging from +24 V to −24 v in forty-nine incremental unit steps. Although the switch arrangement illustrated in FIG. 2 provides the same number of incremental voltage steps as that described above and illustrated in FIG. 1, it is apparent that the switch arrangement shown in FIG. 2 requires more thyristors, specifically thirty-two compared to twenty-four in the switch arrangement shown in FIG. 1, to provide the same number of incremental voltage steps. Furthermore, four individual secondary windings are required in the arrangement shown in FIG. 2 compared to two tapped secondary windings in the preferred embodiment of this invention which increases the cost and complexity of the transformer 100 compared to the transformer constructed according to the teachings of this invention.

Referring now to FIG. 3, there is illustrated another prior art tap changing switch arrangement. As shown therein, transformer 140 includes center-tapped secondary windings 142, 144, 146 and 148 and an untapped secondary winding 150 which are interconnected by a switch arrangement so as to vary the voltage produced between the secondary output terminals 152 and 154 of the circuit. As in the preceding examples, the secondary windings 142, 144, 146 and 148 produce output voltages V, 2 V, 7 V and 14 V, respectively. Due to the center-tapped arrangement of each secondary winding section, the same output voltage is induced in each half of each secondary winding section, such as the portion of secondary winding 142 between the first end 156 and the center tap 160 or between the center tap 160 and the second end 158. However, since current flows from the center tap 160 through each of the winding sections forming the secondary winding in opposite directions, the polarity of the induced voltage in each section will be opposite. In other words, when the portion of secondary winding 142 between center tap 160 and the second end 158 is connected into the circuit, a voltage equal in magnitude to −V will be produced; while the portion of the secondary winding 142 extending between the center tap and the first end 156 will produce a voltage magnitude equal to +V when it is connected into the circuit. Switch means 162, 164 and 166, each including a pair of thyristors connected in inverse, parallel configuration, are connected between the first end 156, center tap 160 and second end 158 of the secondary winding 142, respectively, and the secondary terminal 152 of the circuit. Furthermore, the center tap 160 is directly connected to the first output terminal 168 of the switch arrangement associated with the next secondary winding 144. Since the switch arrangement associated with secondary windings 144, 146 and 148 are identical to that described above for secondary winding 142, it will not be described in detail hereafter.

In operation, the triggering of switch means 162 to a conductive state by suitable control means, not shown, will produce an output voltage between terminals 152 and 168 equal to +V; while the triggering of switch means 166 will produce a voltage between terminals 152 and 168 equal to −V. When switch means 164 is gated on, the entire secondary winding 142 is bypassed thereby producing no voltage between terminals 152 and 168. In this manner, the switch arrangement illustrated in FIG. 3 provides an output voltage between output terminals 152 and 154 that varies between +24 V and −24 V in incremental units as in the previous two examples. Furthermore the switch arrangement shown therein utilizes twenty-four individual thyristors to provide the forty-nine incremental voltage steps, which is the same number of thyristors utilized in the preferred embodiment of this invention, shown in FIG. 1, and which is less than the number of thyristors utilized in the prior art embodiment illustrated in FIG. 2. However, the arrangement illustrated in FIG. 3 utilizes four separate center-tapped secondary windings to provide the same number of incremental voltage steps as the preferred embodiment of this invention, which inreases the cost and complexity of the transformer 140.

In summary, there has been disclosed herein an improved tap changing switch arrangement suitable for use in electrical inductive apparatus which provides a maximum number of discrete output voltage levels, in unit increments, with a smaller number of electrical switch elements and individual secondary windings than similar prior art switch arrangements. Thus, the cost of the switch arrangement is reduced and, since fewer secondary windings are necessary to provide the maximum number of discrete output voltage steps, the cost and complexity of an electrical inductive apparatus, having a tap changing arrangement constructed according to the teachings of this invention, is reduced over prior art apparatus of this type.

What is claimed is:

1. A switching circuit comprising:
   first and second terminals;
   an electrical inductive winding having first and second ends and an intermediate tap dividing said winding into first and second sections, said first and second sections providing different output voltages, said first and second sections each having first and second opposing polarity directions;
   first and second switching means respectively connected between said first end of said winding and said first and second terminals;
   third and fourth switching means respectively connected between said intermediate tap of said winding and said first and second terminals;
   fifth and sixth switching means respectively connected between said second end of said second winding and said first and second terminals;
   each of said first, second, third, fourth, fifth and sixth switching means including a pair of triggerable semiconductive devices connected in inverse parallel configuration and providing, when triggered, two opposing unidirectional conducting paths; and
   control means, operably connected to said first, second, third, fourth, fifth and sixth switching means for controlling the triggering of said first, second, third, fourth, fifth and sixth switching means;
   said control means maintaining a conductive path between said first and second terminals when said switching circuit is operating by triggering a selected one of said first, third and fifth switching means and a selected one of said second, fourth and sixth switching means so as to connect said first section of said winding into said circuit in a predetermined one of said first polarity direction, said second polarity direction or to bypass said circuit and to connect said second section of said winding into said circuit in a predetermined one of said first polarity direction, said second polarity or to bypass said circuit.

2. The switching circuit of claim 1 wherein the output voltage of the second section is twice that of the first section.

3. The switching circuit of claim 1 further including a plurality of electrical inductive windings, each having first and second ends and an intermediate tap which divides each of said windings into first and second sections, with the output voltage of said second section of each of said windings being twice that of the corresponding first section; and wherein the output voltage of the first section of each of said plurality of said windings varies in a geometric progression of seven.

4. A tap changer for an electrical inductive apparatus comprising:
   first and second output circuit terminals;
   a plurality of electrical inductive windings each having first and second ends and an intermediate tap dividing said winding into first and second sections, said first and second sections of each of said windings providing different output voltages, with the output voltage of said second section of each of said windings being twice that of the corresponding first section of said winding, said first and second sections of each of said windings further having first and second polarity directions;
   first and second terminals associated with each of said electrical windings;
   a plurality of first and second switching means, each of said first and second switching means being, respectively, connected between said first end of each said electrical windings and said first and second terminals associated with each of said electrical windings;
   a plurality of third and fourth switching means being, respectively, connected between said intermediate tap of each of said electrical windings and said first and second terminals associated with each of said electrical windings;
   a plurality of fifth and sixth switching means being, respectively, connected between said second end of each of said electrical windings and said first and second terminals associated with each of said electrical windings;

said first terminal of one of said electrical windings being connected to said first terminal of said switching circuit and said second terminal of said one of said electrical windings being connected to said first terminal of the next electrical winding, the second terminal of one of said electrical windings being connected to said second output circuit terminal of said tap changer;

each of said plurality of first, second, third, fourth, fifth and sixth switching means including a pair of triggerable, controlled rectifiers connected in inverse parallel configuration and providing, when triggered, two opposing unidirectional conducting paths;

said first sections of each of said electrical windings having an output voltage which varies in a geometric progression of seven; and control means, operably connected to and controlling the triggering of said plurality of said first, second, third, fourth, fifth and sixth switching means, said control means maintaining a conductive path between said first and second output circuit terminals of said tap changer when said tap changer is conducting current by triggering a selected one of said first, third and fifth switching means and a selected one of said second, fourth and sixth switching means associated with each of said electrical windings so as to connect said first section of each of said windings in a predetermined one of said first polarity direction, said second polarity direction or to bypass said first section and to connect said second section of each of said electrical windings in a predetermined one of said first polarity direction, said second polarity direction or to bypass said second section.

* * * * *